United States Patent [19]
Le

[11] Patent Number: 5,592,572
[45] Date of Patent: Jan. 7, 1997

[54] AUTOMATED PORTRAIT/LANDSCAPE MODE DETECTION ON A BINARY IMAGE

[75] Inventor: Daniel X. D. Le, Burke, Va.

[73] Assignee: The United States of America as represented by the Department of Health and Human Services, Washington, D.C.

[21] Appl. No.: 147,798

[22] Filed: Nov. 5, 1993

[51] Int. Cl.$^6$ .............................. G06K 9/36; G06K 9/46
[52] U.S. Cl. ........................... 382/289; 382/171; 382/176
[58] Field of Search .................................. 382/9, 18, 46, 382/51, 28, 289, 298, 171, 173, 176, 194

[56]  References Cited

U.S. PATENT DOCUMENTS

| 5,018,024 | 5/1981 | Tanioka | 358/457 |
|---|---|---|---|
| 5,050,222 | 9/1991 | Lee | 382/21 |
| 5,065,437 | 11/1991 | Bloomberg | 382/9 |
| 5,072,291 | 12/1991 | Sekizawa | 358/75 |
| 5,073,953 | 12/1991 | Westdijk | 382/9 |
| 5,075,788 | 12/1991 | Funada | 358/458 |
| 5,091,964 | 2/1992 | Shimomura | 382/9 |
| 5,191,438 | 3/1993 | Katsurada et al. | 358/426 |
| 5,202,933 | 4/1993 | Bloomberg | 382/9 |
| 5,202,936 | 4/1993 | Kobiyama | 382/18 |
| 5,285,504 | 2/1994 | Pavlidis et al. | 382/46 |
| 5,506,918 | 4/1996 | Ishitani | 382/289 |

OTHER PUBLICATIONS

Hinds, Stuart C., Fisher, James L., and D'Amato, Donald, "A Document Skew Detection Method Using Run–Length Encoding and Hough Transform", 1990, pp. 464–468.
Fletcher, Lloyd A. and Kasturi, Rangachar, "A Robust Algorithm for Text String Seperation from Mixed Text/Graphics Images", IEEE, 1990, pp. 910–918.
Lee, D. X., "Automated Document Skew Angle Detection Using Projection Profiles, Variances, Component Labelling and the Hough Transform," M. S. thesis, Computer Science Department, George Mason University, Nov. 17, 1992.

Primary Examiner—Jose L. Couso
Assistant Examiner—Matthew C. Bella
Attorney, Agent, or Firm—Philip H. Albert; Townsend and Townsend and Crew LLP

[57]  ABSTRACT

A process for determining an orientation of a binary image includes segmentation of the image into many square regions. Orientations of the individual regions that are determined to be textual squares allow local variations of the binary image to establish an overall orientation for the binary image. The process iteratively groups and consolidates the individual regions into successively larger and larger regions. An orientation for particular ones of the larger regions is determined by a single mode of the various composite modes of the particular one regions having the greatest weight. After all the regions have been consolidated in this fashion, the process uses the orientation of the single consolidated region as the orientation of the binary image.

10 Claims, 7 Drawing Sheets

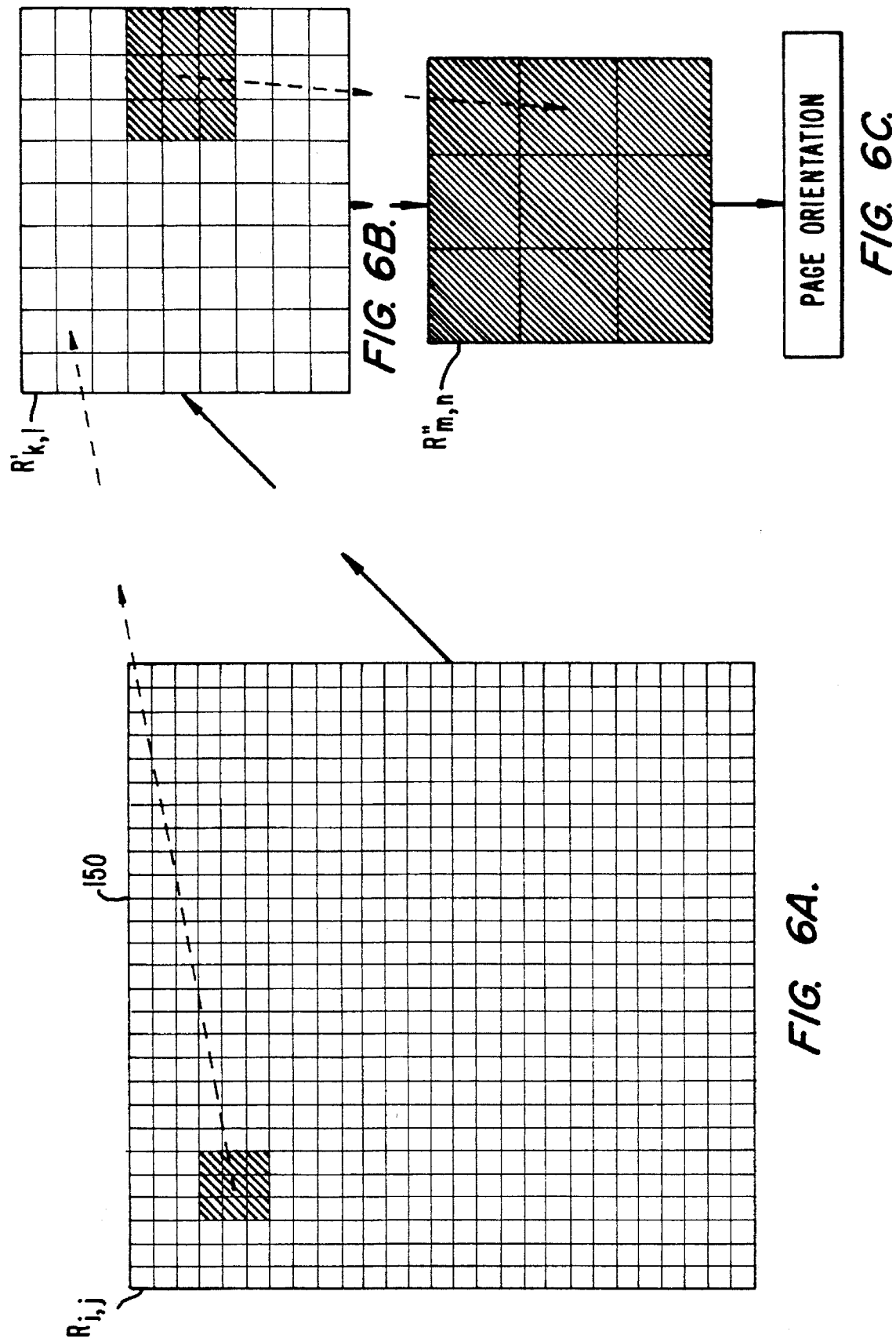

AUTOMATED PORTRAIT/LANDSCAPE MODE DETECTION ON A BINARY IMAGE

BACKGROUND OF THE INVENTION

The present invention relates generally to detection of an orientation of a document image. More specifically, the present invention relates to automatic detection of an orientation of a binary image of a document including text and non-textual components.

Among the growing uses for computer systems include information databases and automation of data entry. Owners and users of paper-based documents are converting and storing information contained on the documents into electronic format for easy access through their computer systems. To assist in the conversion of paper-based information into electronic information suitable for quick searching and retrieval, document analysis systems process binary images of the documents.

A typical document analysis system includes scanning, displaying, quality assurance, image processing, text recognition, image and text database creation, and data retrieval processes. Efforts to improve the quality assurance and the text recognition processes include a desire to automatically determine an orientation of the individual pages. When printing text, a printer will typically output text in either portrait or landscape mode. It is important that a text recognition process know the orientation of text in a binary image before beginning the recognition operation. For automating the text recognition process, automatic detection of page orientation improves overall performance.

It is also important that automated data entry systems know an orientation of text in a binary image. Data entry systems include systems that process a binary image in order to separate out various components of the image, such as headline areas, text line areas, graphic areas, footnote areas, and background areas, for example.

Conventional page orientation systems employ orientation detection algorithms that have degraded performance when analyzing binary images that include significant non-textual elements. These non-textual elements can include graphics, forms, line art, large fonts, and dithered images, among other features. One reason conventional page orientation detection systems have degraded performance is due to their emphasis on global variations in characteristics of the binary image.

SUMMARY OF THE INVENTION

The present invention provides apparatus and method for simply, efficiently and economically detecting an orientation of text in a binary image having non-textual components. The present invention emphasizes local variations in a binary image to detect page orientation rather than global variations.

According to one aspect of the invention, a page orientation detection system divides a binary image into smaller regions. The system classifies each region as either textual or non-textual according to characteristics it exhibits. For each of the smaller regions classified as a textual region, the system determines an orientation.

Thereafter, the system iteratively groups the regions into successively larger and larger regions, determining orientations of the successively larger groups, until it determines an overall orientation of the page.

In a specific embodiment, the binary image is divided into a number of small, uniformly-sized regions, and an orientation is determined for each of the small regions which are found to be textual regions, The small regions are then grouped together to form a fewer number of larger regions. An orientation is determined for each of the larger regions based on the orientations of the smaller regions which make up the larger region. This process is continued, with the larger regions being combined into even larger regions, until only a single region remains covering the entire binary image. The orientations of the regions in the next to last iteration of the consolidation process are used to determine the orientation of the single region in the final iteration of the consolidation process. The orientation of the single region in the final iteration is taken to be the orientation of the binary image.

Reference to the remaining portions of the specifications, including the figures and claims, will realize other features, advantages and modifications to the present invention.

BRIEF DESCRIPTION OF THE DRAWINGS

FIG. 6 is an illustration showing the preferred segmentation of binary image into a number of square regions $R_{i,j}$ with each $R_{i,j}$ having a square sub-array of pixels;

DESCRIPTION OF THE PREFERRED EMBODIMENTS

Figure 1:
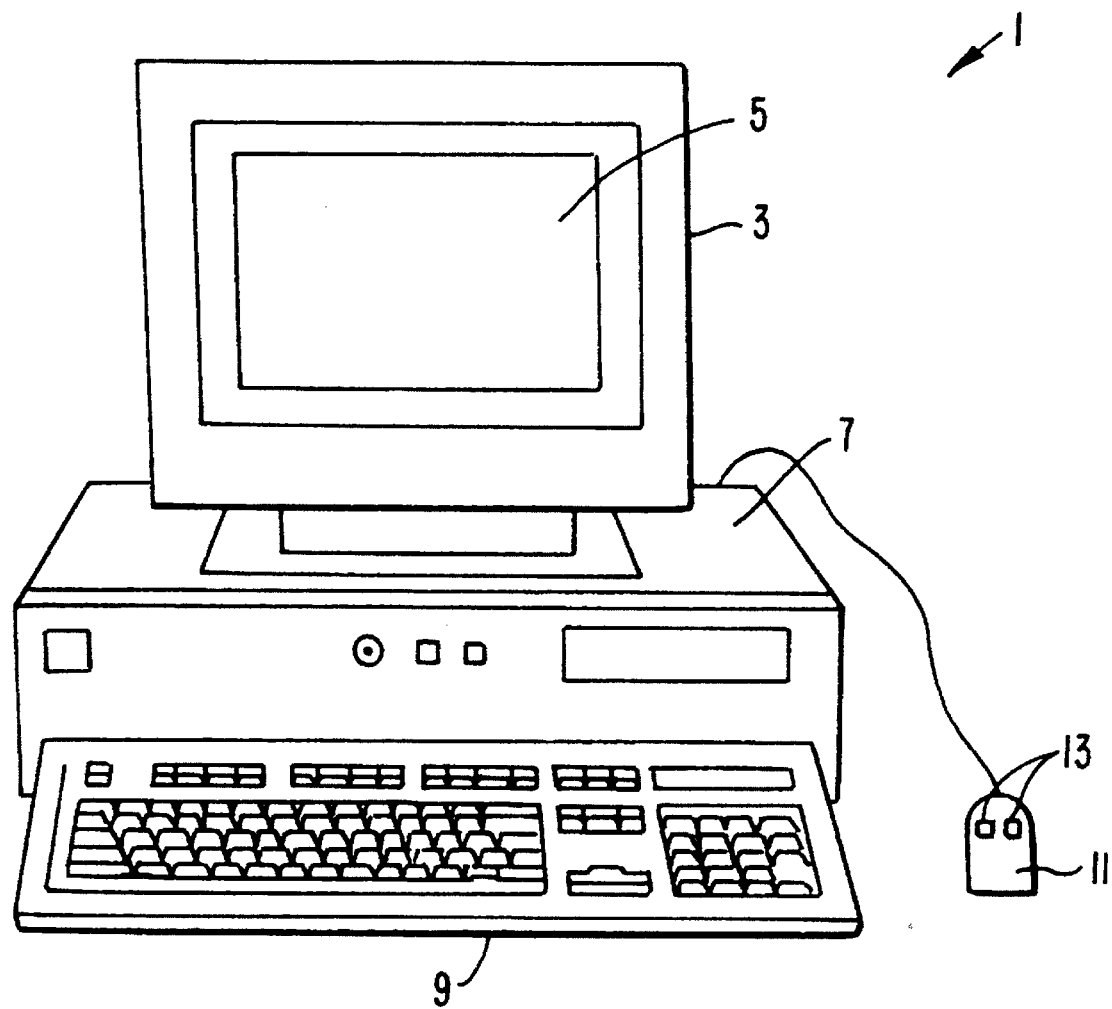
FIG. 1 is a perspective view of a computer system suitable for implementing the present invention.

FIG. 1 is a perspective view of a computer system 1 suitable for implementing the present invention. Computer system 1 includes a monitor 3, a display screen 5, a housing 7, a keyboard 9 and a mouse 11. Mouse 11 may have one or more mouse buttons such as buttons 13. Housing 7 encloses typical computer components such as a processor, memory, disk drives and a peripheral interface adapter (not shown).

Computer system 1 represents but one type of computer system suitable for embodying the present invention. Other types of computer systems suitable for use in the present invention include "notebook," "palmtop" or "hand-held," "pentop," etc., computers. Further, the use of the term "mouse" or "user input device" includes other devices for providing input into a computer, such as a touch screen, trackball, MIDI keyboard, light pen, data glove, relative pointing devices, etc. It will be readily apparent to one of ordinary skill in the art that many types of computer hardware, and configurations of the hardware, are suitable for use in conjunction with the present invention.

Figure 2:
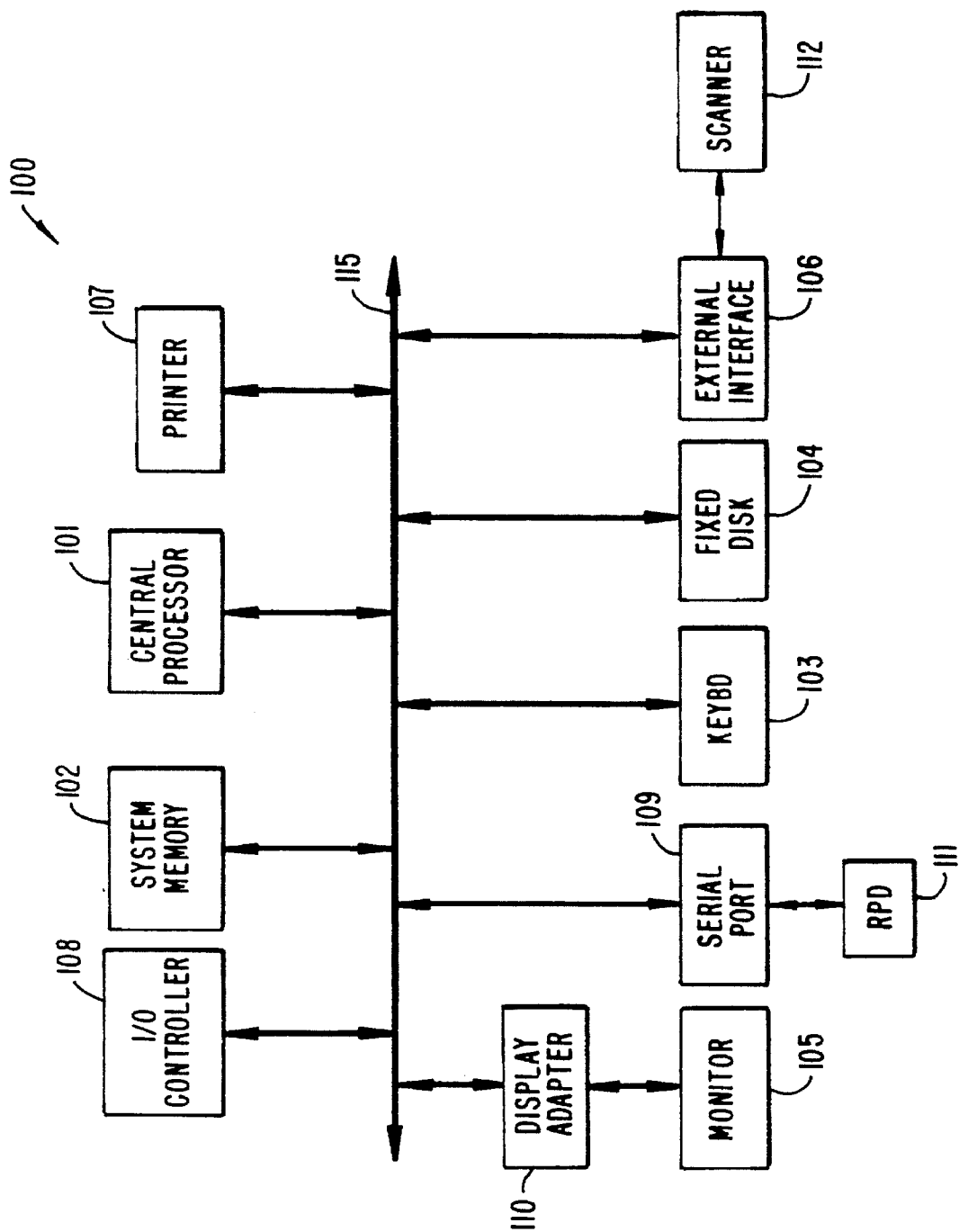
FIG. 2 is a preferred embodiment of a page orientation detection system for implementing an automated portrait/landscape mode detection system using computer system.

FIG. 2 is a preferred embodiment of a page orientation detection system 100 for implementing an automated portrait/landscape mode detection system using computer system 1. The page orientation detection system 100 includes a central processor 101, a system memory 102, an input device, for example a keyboard 103, a fixed disk 104, a monitor 105, an external interface 106, a printer 107, an input/output (I/O) controller 108, a communications port 109, a display adapter 110, a relative pointing device (e.g., mouse) 111, and a scanner 112. A system bus 115 connects the components of the computer system 100, providing a link among them. The keyboard 103 and relative pointing device 111, taken individually or jointly, are data entry devices with which a user controls computer system 100.

Figure 4:
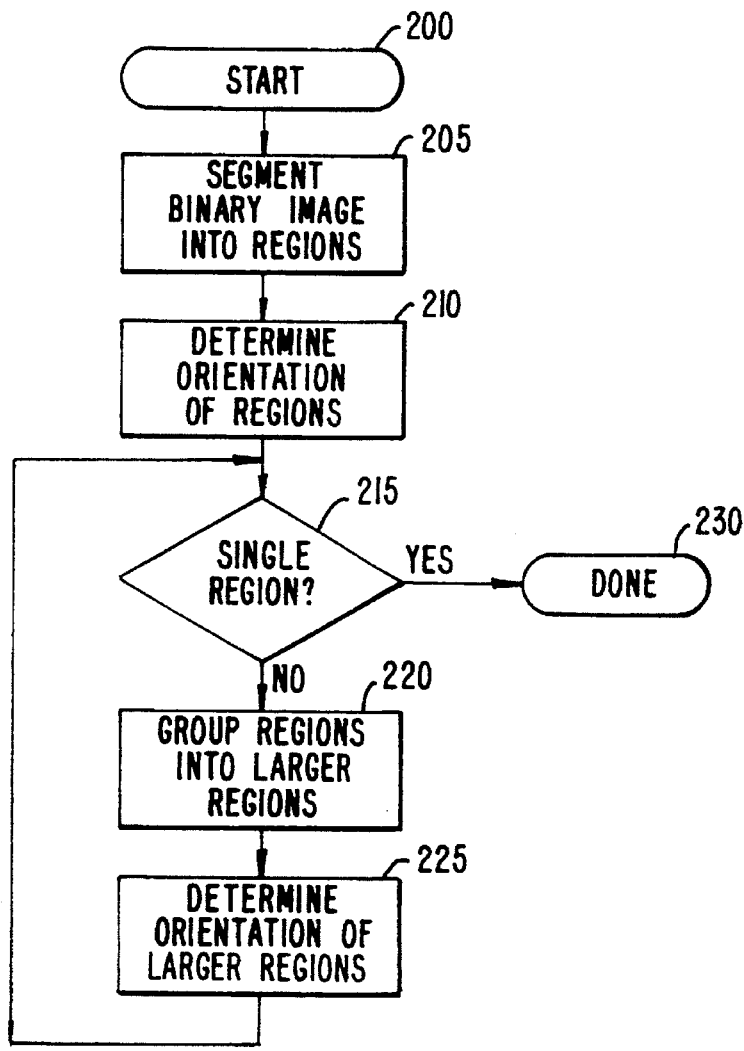
FIG. 4 is a flowchart of process steps for automatically determining a page orientation of binary image.

A preferred embodiment uses an appropriately programmed IBM-compatible personal computer (PC) operating under the MS-DOS operating system, such as a personal computer available from International Business Machines, Inc., of Armonk, N.Y. It is to be understood that other platforms are available and may embody the invention in other forms. The invention is not limited to embodiments that include PC-type computers, but may include other platforms, such as Apple MACINTOSH® computers (Apple Computer, Cupertino, Calif.), or Sun SpareStations (SUN MicroSystems, Inc., Milpitas, Calif.), for example. The flowchart of FIG. 4 is implemented by the central processor 101 under appropriate process control and instruction from procedures stored in the system memory 102 and provided as a part of system 100. It is understood that the preferred embodiment can require computationally-intensive processing and that it may therefore be desired to implement the invention using a high-end PC or a workstation, as those systems are presently measured. It is possible that various ones of the processes of the preferred embodiment are implemented on different processors at different times, or on a single processor in sequence.

In operation, a user operates system 100 to process a printed page that has been converted into a binary image. Scanner 112, as well known, can digitize the printed page and provide a binary copy of the image to system memory 102 or to fixed disk 104. Other procedures exist for providing system 100 with a binary image. For example, a preprocess procedure can map a color image or gray scale image into a binary image sufficient for processing according to the present invention. It is understood that the original document could be such a color or gray scale image. The present invention is directed to processing of a binary image based on on/off pixels, and mappings from color or gray scale to a binary image is not part of the present invention.

In order for central processor 101 to process the binary image, such as for text recognition, central processor 101 determines a page orientation of the binary image. For uses involving only one or a few binary images, the user can review a representation of the binary image presented on monitor 105 and manually decide, for each image, what the proper orientation is. For automatic operation, such as when thousands of binary images require processing, manual determinations by the user are inappropriate.

Figure 3:
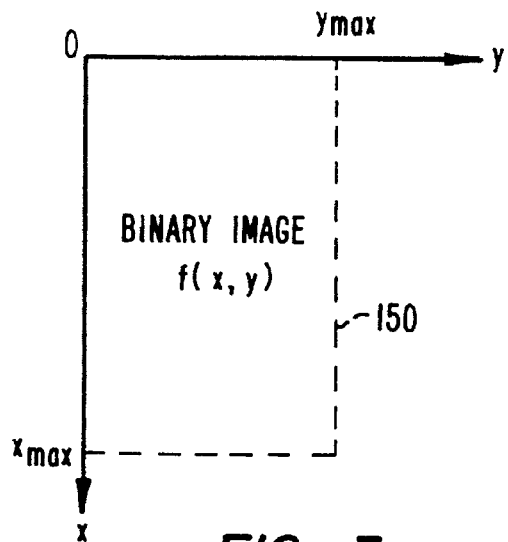
FIG. 3 is an illustration of one representation of a binary image defined by a binary function f(x,y)

FIG. 3 is an illustration of one representation of a binary image 150 defined by a binary function $f(x,y)$. The $f(x,y)$ is referenced to the axes x and y, as shown, with binary image 150 extending from an origin to $(x_{max}, y_{max})$. The $f(x,y)$ includes an array of pixels, the number of which depend upon the values of $x_{max}$ and $y_{max}$, and the resolution (the dots per inch) of the image. For purposes of the preferred embodiment, the binary function $f(x,y)$ has a binary value at each pixel position (i.e., at each $(x, y)$) equal to either a 0 or a 1 (i.e., either white or black).

FIG. 4 is a flowchart of process steps for automatically determining a page orientation of binary image 150. The process shown in FIG. 4 is particularly advantageous to emphasize local variations in binary image 150 in order to determine an overall page orientation. Steps 200–230 define a generalized procedure, details of which will be further explained below. At step 200, START, system 100 accesses binary image 150 from a memory location and advances to step 205. Step 205 segments binary image 150 into a plurality of regions. After segmenting binary image 150, system 100 advances to step 210 to determine an individual orientation of the individual regions judged to be textual regions. Non-textual regions are not used by the preferred embodiment when determining page orientations. There are various procedures available to determine orientations of the individual textual regions. Two appropriate procedures are further described in relation to the discussion of a detailed flowchart presented in FIG. 5. After determining the orientations of the textual regions of binary image 150, system 100 advances to step 215.

Step 215 tests whether all the regions have been consolidated until a single region exists. The first time system 100 checks for a single region, the test of step 215 determines that there are in fact a plurality of regions making up binary image 150, rather than a single region. Therefore, system 100 advances to step 220. Step 220 groups the regions of binary 150 into a set of larger regions. Thereafter, step 225 determines an orientation of each of the larger regions and returns system 100 to the test of step 215. System 100 iteratively cycles through steps 220 and 225 to successively group regions into larger and larger regions until only a single region remains. When only a single region remains, system 100 advances to step 230, STOP, and uses the last determination of orientation made in step 225 as the page orientation of binary image 150.

Figure 5:
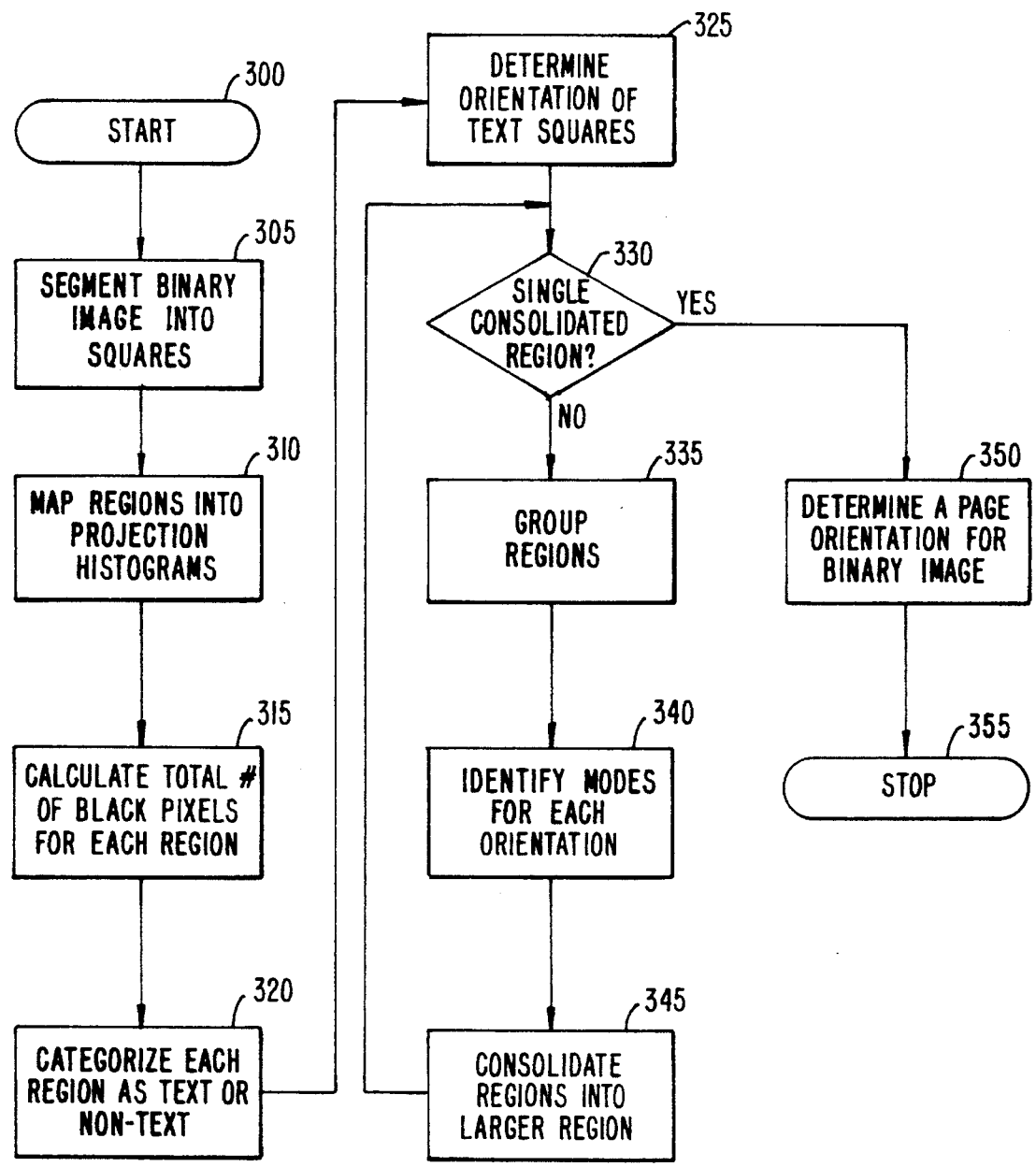
FIG. 5 is a detailed flowchart of the process shown in FIG. 4 further illustrating the preferred embodiment.

FIG. 5 is a detailed flowchart of the process shown in FIG. 4 further illustrating the preferred embodiment. Step 305 segments binary image 150 shown in FIG. 3 into a plurality of square regions. FIG. 6 is an illustration showing the preferred segmentation of binary image 150 into a number of square regions $R_{i,j}$ with each $R_{i,j}$ having a square subarray of pixels. The preferred embodiment segments the binary image into an array that has the same number of squares in a row as in a column. Moreover, system 100 uses the preferred method of consolidating regions that is based on a pyramidal image data structure wherein the number of squares in any row or column must be equal to $3^n$, where n is the number of pyramid layers. System 100 adds blank squares to the fight or to the bottom of binary image 150 to satisfy the $3^n$ condition for the number of rows and columns.

After completing step 305, system 100 advances to step 310 to map each of the plurality of regions $R_{i,j}$ into two orthogonal projection histograms. For purposes of the present invention, projection is an operation that maps binary image 150 in a one-dimensional array called a histogram. Values for any particular histogram are sums of the black pixels along a particular direction. In the preferred embodiment, these directions are orthogonal and defined to lie in the direction of typical text orientations. That is, the two directions are a 0° (horizontal projection histogram) and a 90° (vertical projection histogram) orientation with respect to the horizontal y-axis. These directions correspond to portrait and landscape orientations, respectively.

Figure 7A:
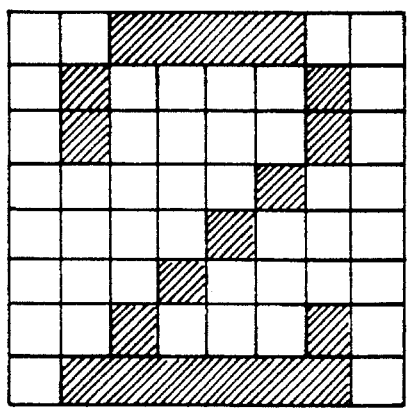
FIG. 7 is a view illustrating creation of a horizontal projection histogram and a vertical projection histogram from an 8×8 array that defines a digit.
Figure 7B:
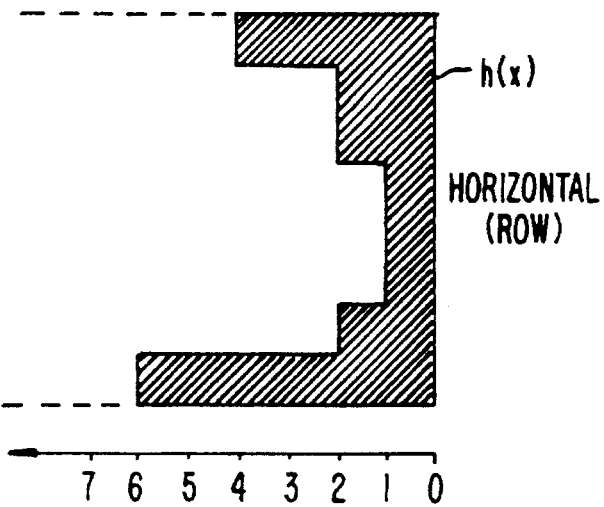
Figure 7C:
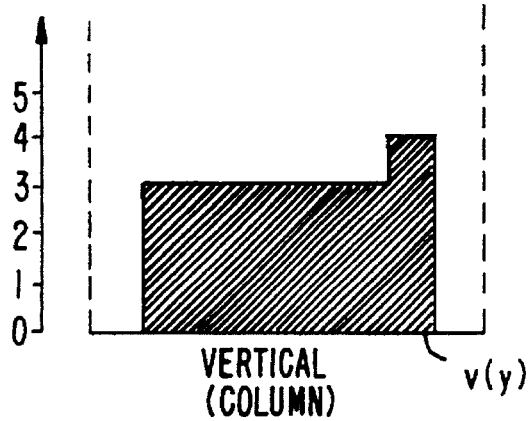

FIG. 7 is a view illustrating creation of a horizontal projection histogram and a vertical projection histogram from an 8×8 array that defines a digit. As shown, the digit is a "2". The horizontal projection histogram defined as h(x) of binary image f(x,y) 150 is a sum of black pixels projected onto the vertical axis x. FIG. 7 includes h (x) for x equals 0–7. For example, h(0)=4.

The vertical projection histogram defined as v(y) of binary image f(x,y) 150 is a sum of black pixels projected onto the horizontal axis y. FIG. 7 includes v(y) for y=0–7. For example, v(6)=4.

Projection profiles h(x) and v(y) of $R_{i,j}$, and corresponding variances of these projection profiles, form the basis of part of the page orientation detection process shown in FIG. 5. A variance of a distribution is the average squared deviation of each value in the distribution from its mean value. A variance measures a spread of the distribution. Generally, for portrait mode, a shape of the horizontal projection histogram for an entire binary function f(x,y) has more fluctuation than that of the vertical projection histogram. These fluctuations are due to the lines of text, with blank spaces between, running horizontally across the image. Comparing the variance between h(x) and v(y) allows system 100 to detect the page orientation. The histogram that has the largest variance determines the page orientation.

The following derivation illustrates the development of the page orientation detection formulas for performing page orientation detection. Consider an n×n binary image f(x,y) and let s represent the total number of black pixels of the square. Variances $\sigma_h$ (horizontal variance) and $\sigma_v$ (vertical variance) are defined as described above. Because binary function f(x,y) is a square image, the mean value of both the h(x) and v(y) projection histograms are the same and equal s/n. Defining variances $\sigma_h$ and $\sigma_v$ results in:

$$\sigma_h = \left[ h(0) - \left(\frac{s}{n}\right)\right]^2 + \left[h(1) - \frac{s}{n}\right]^2 + \ldots + \left[h(n-1) - \frac{s}{n}\right]^2 \quad (1)$$

$$\sigma_h = [h^2(0) + h^2(1) + \ldots + h^2(n-1)] + c \quad (2)$$

and similarly:

$$\sigma_v = [v^2(0) + v^2(1) + \ldots + v^2(n-1)] + c \quad (3)$$

where:

$$c = \left[ n\left(\frac{s}{n}\right)^2 - 2\left(\frac{s}{n}\right)s \right], \text{ a constant.} \quad (4)$$

$S_h$ and $S_v$ are the squared sums of the horizontal and vertical projection histograms, respectively, that are defined as:

$$S_h = h^2(0) + h^2(1) + \ldots + h^2(n-1) \text{ and} \quad (5)$$

$$S_v = v^2(0) + v^2(1) + \ldots + v^2(n-1). \quad (6)$$

Therefore, the formulas for $\sigma_h$ and $\sigma_v$ can be rewritten:

$$\sigma_h = S_h + c, \text{ and} \quad (7)$$

$$\sigma_v = S_v + c. \quad (8)$$

Figure 8:
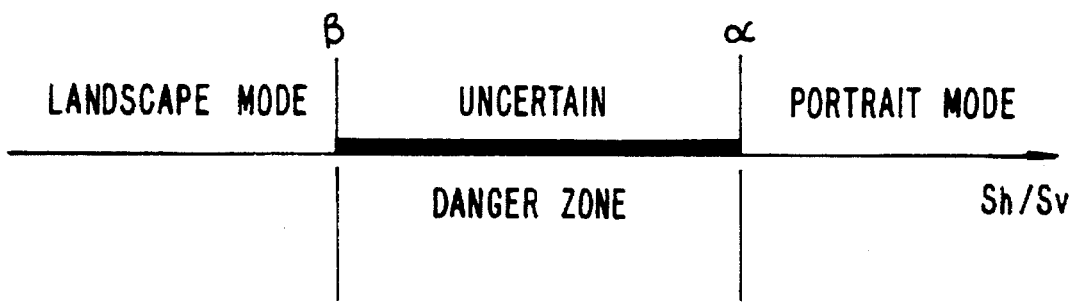
FIG. 8 is a diagrammatic representation of the ratio $S_h/S_v$, including a danger zone.

This derivation illustrates that comparison of the squared sums $S_h$ and $S_v$ allows system 100 to detect an orientation of a square binary image. A ratio, $S_h/S_v$, provides information regarding the orientation of a page. There is a range, a danger zone for $S_h/S_v$, that indicates that the detection of the page orientation from $S_h/S_v$, is uncertain. FIG. 8 is a diagrammatic representation of the ratio $S_h/S_v$, including the danger zone. In FIG. 8, $\alpha$ and $\beta$ are respectively the upper and lower bound values of the danger zone of the $S_h/S_v$ ratio.

Returning to FIG. 5, after mapping regions in step 310, system 100 advances to step 315 to calculate the total number of black pixels for each region. Thereafter, system 100 advances to step 320 to categorize each region $R_{i,j}$ as a textual or a non-textual region. In the preferred embodiment, system 100 makes a check of at least seven characteristics of each region $R_{i,j}$ to determine whether any square of binary image 150 satisfies at least one of the following conditions. A non-textual square is any square wherein:

(a) a ratio between a total number of black pixels and a total number of pixels in a square is less than a pre-defined parameter called BLANK_SQUARE_RATIO, or (b) a ratio between a total number of black pixels and a total number of pixels in a top-half square, or in a bottom-half square, or in a left-half square, or in a right half square, is less than the pre-defined parameter BLANK_SQUARE_RATIO, or (c) a ratio between a total number of black pixels and a total number of pixels in a square is greater than a pre-defined parameter called GRAPHICS_SQUARE_RATIO, or (d) a ratio between a total number of black pixels and a total number of pixels in a top-half square, or in a bottom-half square, or in a left-half square, or in a right half square, is greater than the pre-defined parameter GRAPHICS_SQUARE_RATIO, or (e) a length of any black run in a row or a column is greater than a pre-defined parameter called LARGE_FONT_LENGTH_PIXELS, or (f) a sum of the black runs in a row or column of a square is greater than a pre-defined parameter called MAXIMUM_OBJECTS_SQUARE, or (g) at least a total of $\gamma$ rows or columns of a square that satisfy the condition that in each row or in each column of a square, a total number of black pixels is less than or equal to the product of 2 (for 2-pixel black run) and the number of black runs.

The BLANK_SQUARE_RATIO is the maximum ratio between a total number of black pixels and a total number of pixels in a "blank" square. The GRAPHICS_SQUARE_RATIO is the minimum ratio between a total number of pixels and a total number of pixels in a "graphic" square. The LARGE_FONT_LENGTH_PIXELS is the maximum allowable length in pixels of a black run in a row or column of a square. The MAXIMUM_OBJECTS_SQUARE is the maximum allowable number of black runs in a row or column of a square.

Returning to FIG. 5, step 320, categorizing each region as a text square or a non-textual square, uses the seven conditions identified above. Textual squares are those that satisfy none of the seven conditions. After categorizing the individual squares, system 100 advances to step 325 to determine an orientation of textual squares. This determination of orientation employs either the page orientation formulas:

$$S_h \geq \alpha \cdot S_v, \text{ and} \quad (9)$$

$$S_h < \beta \cdot S_v, \text{ or} \quad (10)$$

another procedure for page orientation analysis. As described above, these equations 9 and 10 determine portrait mode or landscape mode, respectively. For any square region $R_{i,j}$ having $S_h/S_v$ lying between $\alpha$ and $\beta$, system 100 is unable to reliably determine its portrait or landscape mode. System 100 assigns such a square region of binary image 150 a value of 0 representing an indeterminate mode. Regions having indeterminate modes do not participate in the page orientation detection process.

Equations 9 and 10 are calculation intensive and using them can therefore slow orientation determinations. System 100 uses a procedure other than the formulas for determining page orientation prior to using the equations. This procedure includes a projection profiles analysis. For printed matter, line spacings (white lines) separate individual text lines. Typically, the height of the white lines is dependent upon the font size of the text lines. Taking a horizontal projection histogram of a square binary image having several lines of horizontal text produces a histogram with definite characteristics. Such a histogram has a series of black and white stripe patterns (or white and black stripe patterns). Either of these patterns are referred to as a black-and-white text pattern.

Figure 9:
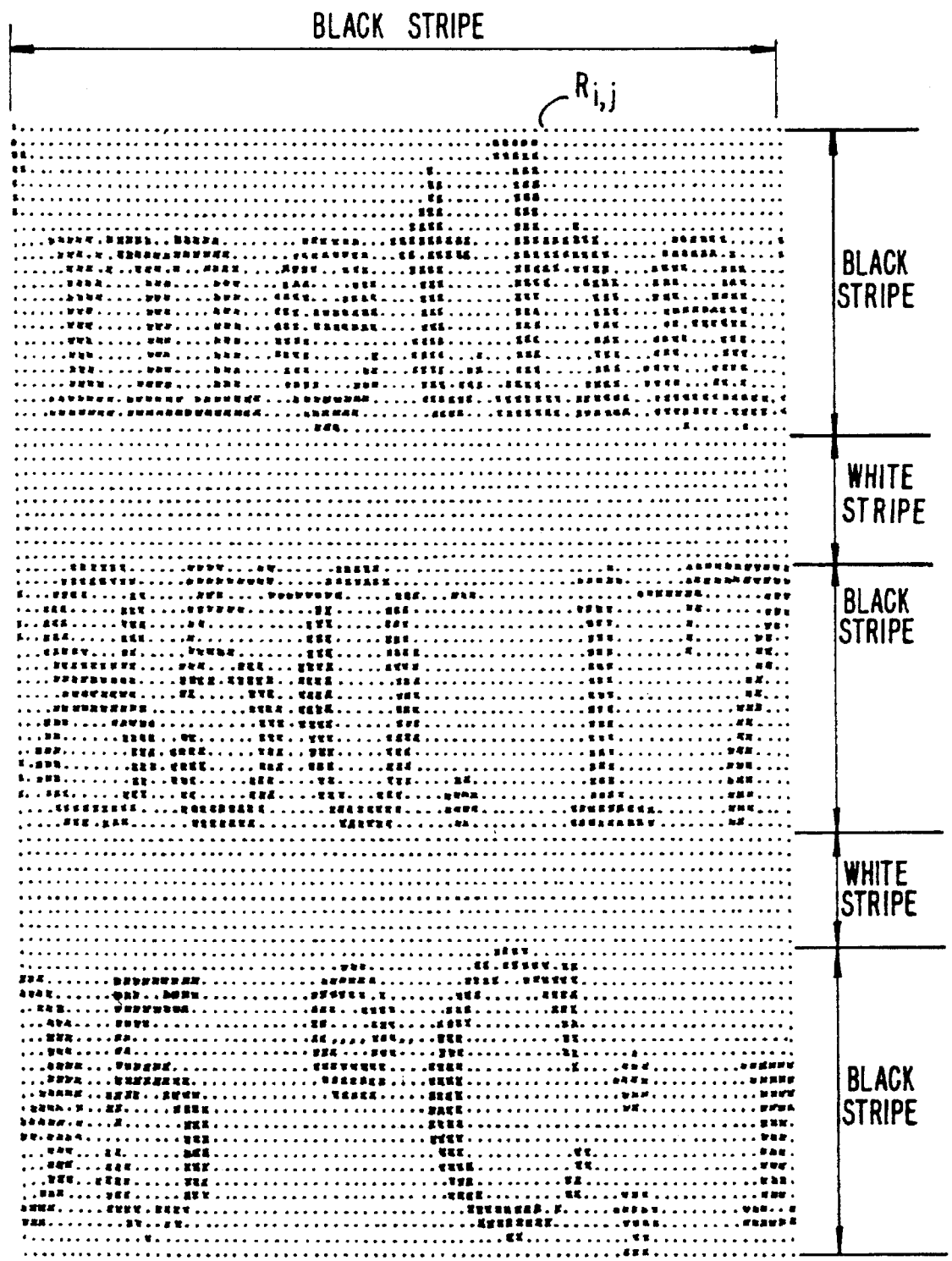
FIG. 9 is a view of a particular square region $R_{i,j}$ of a simple binary image wherein the square region has a black and white text pattern.

In some instances, system 100 is able to determine a page orientation of a textual square by analyzing the projection profiles for a black-and-white text pattern. FIG. 9 is a view of a particular square region $R_{i,j}$ of a simple binary image 150 wherein the square region has a black and white text pattern. A horizontal projection histogram of the image has the characteristic black and white text pattern, but the vertical projection histogram does not. Therefore, for any square region of a binary image such as that shown in FIG. 9, system 100 determines that it is in portrait mode.

System 100 determines that any particular projection histogram has the black and white text pattern if all black and white stripes satisfy the following B&W conditions:

(I) All black stripe lengths are greater than or equal to MIN_LENGTH_NONZERO, (II) All black stripe lengths are less than or equal to MAX_LENGTH_NONZERO, (III) All white stripe lengths are greater than or equal to MIN_LENGTH_ZERO, or (IV) The maximum of a white stripe length is less than or equal to twice the minimum of a white stripe length.

The MIN_LENGTH_NONZERO and MAX_LENGTH_NONZERO are the minimum and maximum lengths (in pixels) of a black stripe and a white stripe respectively. The MIN_LENGTH_ZERO is the minimum length in pixels of a white stripe.

The page orientation analysis using the black-and-white text pattern analysis operates as follows:

(i) If only a horizontal projection histogram has the black-and-white text pattern, then the square is in portrait mode;

(ii) If only a vertical projection histogram has the black-and-white text pattern then the square is in landscape mode;

(iii) If both horizontal and vertical projection histograms do not satisfy conditions (I) and (III) of B&W conditions listed above then the corresponding square is considered as a non-textual square and ignored in determining page orientation;

(iv) Otherwise no conclusion can be made regarding page orientation of the square based on projection profiles analysis.

Further processing of squares of (iv) make use of the page orientation formulas set forth in equations 9 and 10.

In FIG. 5 at step 325, system 100 determines an orientation of each textual square. System 100 has divided the entire binary image 150 defined by binary f(x,y) into a plurality of regions $R_{i,j}$, with each $R_{i,j}$ classified as textual or non-textual. By ignoring non-textual squares from the analysis, system 100 is able to reduce orientation detection errors. System 100 thus is able to emphasize local variations rather than global variations and determines page orientations based upon orientation of textual squares only. At step 325, the projection profiles analysis, or the orientation formulas involving $S_h$ and $S_v$, determine the orientation. System 100 preferably uses the projection profiles analysis first, resorting to the formulas only if the projection profiles analysis cannot establish an orientation. Thereafter, system 100 advances to step 330 to test a condition. Step 330 determines whether the individual regions $R_{i,j}$ have been consolidated into a single region. If not, system 100 advances to step 335.

For each textual square determined to be in either portrait mode or landscape mode, system 100 assigned that square's total number of black pixels as its mode weight. For indeterminate squares, system 100 assigns 0 as the mode weight.

Thereafter, system 100 groups 9-neighboring squares into a new region. FIG. 7 illustrates this grouping. As shown, 9-neighboring squares $R_{i,j}$ for i&j={3, 4, 5} map to $R'_{k,l}$ with k=1 and l=1. After this grouping, system 100 advances to step 340 to identify modes for each orientation.

System 100 calculates a total portrait mode of black pixels by adding the weights of all portrait mode squares (i.e., the system determines the total number of black pixels in those squares of each group having a portrait orientation). Similarly, system 100 calculates a total landscape mode of black pixels by adding the weights of all landscape mode squares (i.e., the system determines the total number of black pixels in those squares of each group having a landscape orientation). System 100 determines an orientation and mode weight of each of the larger squares $R'_{k,l}$ as follows:

(a) If the total portrait mode black pixel count (the number of black pixels in the squares of the group having portrait orientation) is greater than or equal to the total landscape mode black pixel count (the number of black pixels in the squares of the group having landscape orientation) then the orientation for the $R'_{k,l}$ region made up of the respective individual $R_{i,j}$ regions is assigned to be in portrait mode and the associated mode weight is assigned to have a value equal to the total portrait mode black pixel count, (b) Otherwise, the orientation of the region $R'_{k,l}$ is assigned to be in landscape mode and the mode weight is assigned to have a value equal to the total landscape mode black pixel count.

In other words, this procedure determines a total black pixel count for all the squares of any grouped region having a particular orientation (portrait or landscape). The orientation represented by the similarly oriented squares having the greatest total number of black pixels is assigned to the grouped region. This effectively provides that similarly oriented squares having a non-dominant orientation are ignored for further processing and do not participate in decisions regarding detection of page orientations.

System 100 consolidates the squares $R_{i,j}$ into the larger squares $R'_{k,l}$ at step 345, assigning each larger region a weight equal to the black pixel count of the squares having the dominating orientation determined at step 340. System 100 returns to step 330 to determine if all the squares have been consolidated into a single region. If not, system 100 cycles through steps 330–345, again grouping 9-neighboring squares (but larger squares) and accumulating weights of similarly oriented regions. This time, squares $R'_{k,l}$ are mapped and grouped to squares $R''_{m,n}$. The $R''_{m,n}$ squares have their orientations and weights determined until the entire binary image f(x,y) has been consolidated into a single region.

Thereafter, system 100 advances to step 350 and determines the page orientation for the binary image to be equal to the mode of the single remaining consolidated region.

Once system 100 determines the mode (portrait or landscape) from the similarly oriented sub-regions having the greatest weight, system 100 stops, step 355.

The preferred embodiment uses the following values for the pre-defined parameters described above. The parameter values are expressed in terms of dpi (dots per inch) to represent a resolution of the binary image (the preferred embodiment uses 200 dpi):

---

$\alpha = 1.00$
$\beta = 0.60$
Size of a square = $2 \cdot (14 \cdot dpi)/72$ pixels [80 pixels @ 200 dpi]
GRAPHICS_SQUARE_RATIO = 0.444
BLANK_SQUARE_RATIO = 0.045
LARGE_FONT_LENGTH_PIXELS = $(15 \cdot dpi)/72$ pixels
[42 pixels @ 200]
MAXIMUM_OBJECTS_SQUARE = $(2 \cdot$ Size of a square$)/5$
[32 pixels]
$\delta = 0.33$
MIN_LENGTH_ZERO = $\delta \cdot (4 \cdot dpi)/72$ pixels [4 pixels]
MIN_LENGTH_NONZERO = $(4 \cdot dpi)/72$ pixels [11 pixels]
MAX_LENGTH_NONZERO = $(14 \cdot dpi)/72$ pixels [38 pixels]
$\gamma =$ Size of a square$/2$ [40 pixels]

---

EXPERIMENTAL RESULTS

An embodiment was implemented using a PC-based document analysis system including a Fujitsu scanner, a Kofax image processing board, and a DISCORP monitor. The analysis system was used to scan paper-based documents, compress/decompress and display scanned binary images. The typical size of the paper-based documents was 8.5×11 inches. The scanning resolution of the binary image was 200 dots per inch.

As described above, for some computationally intensive tasks such as the page orientation detection process, a Sun SPARC 10, model 30 computer was used for a portion of the processing. The model 30 had an average time to process a scanned binary image equal to about two seconds.

Two sets of test samples were analyzed: (1) 6,087 pages from 63 different medical journals, and (2) 5,190 pages from 52 different medical journals. For the first set, the page orientation algorithm correctly determined page orientations for 6,083 pages (a 99.93% accuracy). 5,186 pages of the second set were determined correctly (a 99.92% accuracy).

CONCLUSION

In conclusion, the present invention provides a simple, efficient solution to a problem of detecting an orientation of a binary image having more than insubstantial amount of non-textual images. While the above is a complete description of the preferred embodiments of the invention, various alternatives, modifications, and equivalents may be used. Therefore, the above description should not be taken as limiting the scope or the spirit of the present invention which the appended claims define.

What is claimed is:

1. A method for determining an orientation of a binary image, wherein the binary image is generated from a scan of a document, the method comprising the steps of:

a) scanning the document to generate the binary image;

b) segmenting the binary image into a first plurality of regions, wherein bounds of regions in the first plurality of regions are independent of content of the binary images;

c) determining, for regions in the first plurality of regions, which of such regions are textual regions;

d) determining an orientation of at least each textual region of said first plurality of regions; and e) grouping regions of said first plurality of regions into regions of a second plurality of regions;

f) determining, for regions in the second plurality of regions, which of such regions are textual regions;

g) determining an orientation of at least each textual region of the second plurality of regions; and h) determining an orientation of the binary image from the orientations determined for the second plurality of regions.

2. The method of claim 1 wherein said step of segmenting the binary image into a first plurality of regions is a step of segmenting the binary image into uniformly-sized, square regions.

3. The method of claim 1 wherein steps d) and g) use projection histograms to determine orientations.

4. A method for processing a binary image to detect a page orientation, comprising the steps of:

a) scanning a document to generate the binary image;

b) segmenting the binary image into a plurality uniformly-sized of regions;

c) mapping each region of said plurality of regions into a projection histogram for that region;

d) calculating a total number of black pixels for each region of said plurality of regions;

e) categorizing each region of said plurality of regions as a textual region or a non-textual region;

f) recognizing an orientation for each textual region of said plurality of regions based on the at least one projection histogram for said each textual region;

g) consolidating regions of said plurality of regions into a first plurality of consolidated regions;

h) identifying, for each consolidated region of the first plurality of consolidated regions, a mode for each possible orientation of image portions within said each consolidated region;

i) evaluating orientation for each of said consolidated regions based on similarly oriented regions of each particular consolidated region;

j) further consolidating consolidated regions into fewer and larger consolidated regions, while identifying for said fewer and larger consolidated regions an orientation based on the orientation of regions consolidated; and k) when a single consolidated region remains which covers the binary image, determining a page orientation for the binary image by finding an orientation of the remaining single consolidated region from an orientation associated with the orientation of regions within the single consolidated region which have the greatest weighted total mode for such orientation.

5. A method for determining an orientation of a binary image of a document, comprising the steps of:

a) scanning a document to form the binary image;

b) segmenting the binary image into a first plurality of regions which are uniformly sized;

c) determining, for each region of said first plurality of regions, whether said region is a textual region;

d) determining an orientation for each said textual region;

e) grouping a plurality of sets of neighboring regions of said first plurality of regions into a second plurality of consolidated regions which are uniformly-sized and larger than regions of the first plurality of regions;

f) determining an orientation for each particular consolidated region of said second plurality of consolidated regions using said orientations of said textual regions in the particular set of neighboring regions of said first plurality of regions making up said particular consolidated region of said second plurality of regions;

g) grouping a plurality of sets of neighboring previously consolidated regions of a plurality of consolidated regions into a lesser plurality of larger consolidated uniform regions;

h) determining an orientation for each particular consolidated region of said lesser plurality of consolidated regions using said orientations of said previously consolidated regions making up said particular consolidated region of said lesser plurality of consolidated regions;

i) repeating steps g) and h) until a single consolidated region remains; and j) assigning said orientation of said single consolidated region as the orientation of the binary image.

6. A method for determining an orientation of a binary image of a document, comprising the steps of:

a) scanning a document to form a binary image;

b) segmenting the binary image into a $j^n \times k^n$ array of uniformly-sized regions, where j, k, and n are all natural numbers;

c) determining, for each region of said $j^n \times k^n$ array, whether said region is a textual region;

d) determining an orientation for each said textual region;

e) grouping a plurality of sets of j×k regions of said $j^n \times k^n$ array into a $j^{n-1} \times k^{n-1}$ array of uniformly-sized consolidated regions;

f) determining an orientation for each consolidated region of said $j^{n-1} \times k^{n-1}$ array of uniformly-sized consolidated regions using said orientations said textual regions in said set of j×k regions making up each said consolidated region;

g) grouping a plurality of sets of j×k regions of said $j^{n-(a-1)} \times k^{n-(a-1)}$ array into a $j^{n-a} \times k^{n-a}$ array of uniformly-sized consolidated regions, where a is a natural number initially equal to 2;

h) determining an orientation for each consolidated region of said $j^{n-a} \times k^{n-a}$ array using said orientations of said previously consolidated j×k regions making up each said consolidated region of said $j^{n-a} \times k^{n-a}$ array;

i) iterating steps f) and g) until a single consolidated region remains wherein a is incremented by 1 for each iteration until a equals n−1; and j) assigning said orientation of said single consolidated region as the orientation of the binary image.

7. The orientation determining method of claim 6 further comprising a step of appending a plurality of blank regions to the binary image so as to produce a square array with j equal to k.

8. The orientation determining method of claim 7 wherein j equals 3.

9. The method of claim 1, further comprising the steps of repeating steps e) though h) to consolidate the second plurality of regions into a third plurality of regions, and so on, until regions are consolidated into a single region covering the binary image and an orientation of the single region is determined, the orientation of the single region being the orientation of the binary image.

10. The method of claim 3 wherein said step of determining comprises the steps of:

assigning a combined weight to each set of a plurality of sets of neighboring regions in similarly oriented regions; and selecting a particular orientation having a largest combined weight as an orientation for the set.

* * * * *